Patented Aug. 7, 1951

2,562,989

UNITED STATES PATENT OFFICE 2,562,989

UPGRADING OLEFINIC STOCKS

Ernest A. Naragon, Glenham, N. Y., assignor to The Texas Company, New York, N. Y., a corporation of Delaware No Drawing. Application September 15, 1948, Serial No. 49,463

1 Claim. (Cl. 196—50)

This invention relates to the treatment of olefinic stocks for the purpose of improving such stocks as components of gasoline or motor fuel. The invention is particularly adapted for the processing of stocks to increase the octane value and at the same time obtain products of low olefine content or highly saturated character.

The invention is applied to the treatment of low boiling hydrocarbons in approximately the gasoline boiling range which are rich in olefins, particularly simple or straight chain olefins. I have discovered that by contacting such olefinic stocks with a molybdenum oxide boron oxide alumina catalyst in the presence of hydrogen at suitable temperatures a combined isomerization and hydrogenation of the olefins takes place. In the presence of this catalyst at temperatures generally suitable for isomerization, hydrogenation takes place with the result that isomers of increased anti-knock quantity are formed while at the same time an extensive hydrogenation occurs so that the product is not only of increased anti-knock value but is low in unsaturates.

The catalyst adapted for catalyzing the combined isomerizing and hydrogenating reactions consists essentially of activated alumina containing both molybdenum oxide and boron oxide. The catalyst is conveniently prepared by taking an activated alumina and treating it with solutions adapted to deposit boron oxide and molybdenum oxide on the active surfaces of the alumina.

The temperatures adapted for effecting this combined isomerization and hydrogenation in the presence of the molybdenum oxide boron oxide alumina catalyst will vary somewhat with the particular olefinic stock treated. In general, however, the temperature range is about 600° F. up to 750° F. or 775° F. The isomerization reactions which take place involve chain branching as well as bond shifting. There is very little chain branching at temperatures of 500° F.; active isomerization begins around 600° F. The anti-knock value of the product increases somewhat as the temperature is raised in the range from 600° F. to 750° F. and with further increases in temperature the anti-knock value tends to decrease. The hydrogenation becomes active at temperatures around 600° F. and in general increased hydrogenation is effected with increasing temperatures up to about 800° F. Temperatures above 800° F. are not recommended since cracking and unsuitable reactions take place with such increased temperatures. Thus the temperatures adapted to accomplish the most effective combined isomerization and hydrogenation are within the range of about 600° F. up to 750° F. or 775° F. and in any case not over 800° F.

Comparatively low hydrogen pressures such as 100–400 pounds are suitable for the process. It is not necessary to use high pressures for the operation.

It might be expected that by treating the olefins in this manner the presence of hydrogen would have an inhibiting effect on the isomerization but I find that this effect is very slight indeed so that the production of a highly isomerized product which is also highly saturated may be readily accomplished.

By way of example, a hexylene fraction was passed over a catalyst consisting of molybdenum oxide and boron oxide on activated alumina. In preparing this catalyst an activated alumina was used which contained 5.4% silica which was included in the alumina for heat stabilizing purposes. The alumina had a low sodium oxide content of only 0.11%. The activated alumina was mixed with molybdic acid, concentrated ammonium hydroxide and water, the mixture was evaporated to dryness and calcined at 1000° F. for six hours. The calcined material was mixed with a hot aqueous solution of boric acid, the mixture dried, then calcined at 1000° F. for six hours and finally screened to 14 mesh. The catalyst product consisted of approximately 5% molybdenum oxide, 10% boron oxide, 81% alumina and 4% silica.

In a number of runs the hexylene was passed over the molybdenum oxide boron oxide activated alumina catalyst at various temperatures both with and without hydrogen. All the runs were made with liquid space velocities, v./v./hr., of 0.5. In the runs with hydrogen, a hydrogen pressure of 200 pounds per square inch was used. The following table gives the bromine addition numbers of liquid products obtained at various temperatures with and without hydrogen pressure:

|  | A | B | C | D |
| --- | --- | --- | --- | --- |
|  | No $H_2$ | With $H_2$ | No $H_2$ | With $H_2$ |
| Temp., °F | 609 | 614 | 755 | 776 |
| Bromine No | 159 | 41 | 183 | 5 |

The table clearly shows the hydrogenation that takes place in the presence of hydrogen with the molybdenum oxide boron oxide activated alumina catalyst under isomerizing conditions. This combined isomerization and hydrogenation uniformly takes place in the presence of the molybdenum oxide boron oxide activated alumina catalyst which is not the case with the activated alumina itself or boron oxide-alumina. Thus, for example, when hexylene was passed over activated alumina without hydrogen at a temperature of 608° F., the bromine No. was 176, while treating with the same catalyst under 200 pounds hydrogen pressure at 611° F., the bromine No. was 174. The molybdenum oxide boron oxide activated alumina catalyst appears to be unique in catalyzing hydrogenation concomitantly with isomerization. The liquid products obtained by the combined isomerizing and hydrogenating operations were substantially paraffinic in character and approximated 93% by weight of the hexylene feed. The products contained quantities of such high octane hydrocarbons as 2-methylpentane, 3-methylpentane and 2,3-dimethylbutane.

Although a preferred embodiment of the invention has been described herein, it will be understood that various changes and modifications may be made therein, while securing to a greater or less extent some or all of the benefits of the invention, without departing from the spirit and scope thereof.

I claim:

The process of improving olefinic stocks boiling within the gasoline range for use as motor fuel that comprises contacting the olefinic stock in the presence of added hydrogen and at a temperature exceeding 600° F. and not substantially above 775° F. with a catalyst comprising essentially activated alumina impregnated with molybdenum oxide and boron oxide and containing approximately 5% molybdenum oxide, 10% boron oxide, 81% alumina and 4% silica, said catalyst being further characterized in that in the preparation thereof the solutions for impregnating the molybdenum oxide and boron oxide have been separately evaporated to dryness on the activated alumina and the material calcined at a temperature of the order of 1,000° F., to thereby effect concomitant isomerization and hydrogenation and formation of products of increased anti-knock quality.

ERNEST A. NARAGON.

REFERENCES CITED

The following references are of record in the file of this patent:

UNITED STATES PATENTS

| Number | Name | Date |
|---|---|---|
| 2,161,984 | Sweeney et al. | June 13, 1939 |
| 2,335,246 | Haensel et al. | Nov. 30, 1943 |
| 2,335,717 | Welty et al. | Nov. 30, 1943 |